(12) United States Patent
Steinberg

(10) Patent No.: US 9,083,235 B2
(45) Date of Patent: Jul. 14, 2015

(54) METHODS AND APPARATUS FOR SUPPLYING THREE PHASE POWER

(75) Inventor: Shmuel Steinberg, Victoria (AU)

(73) Assignee: SET ELECTRICAL ENGINEERING PTY LTD., Victoria (AU)

( * ) Notice: Subject to any disclaimer, the term of this patent is extended or adjusted under 35 U.S.C. 154(b) by 259 days.

(21) Appl. No.: 13/695,324

(22) PCT Filed: May 11, 2011

(86) PCT No.: PCT/AU2011/000545
§ 371 (c)(1),
(2), (4) Date: Dec. 17, 2012

(87) PCT Pub. No.: WO2011/140597
PCT Pub. Date: Nov. 17, 2011

(65) Prior Publication Data
US 2013/0200862 A1 Aug. 8, 2013

Related U.S. Application Data

(60) Provisional application No. 61/333,288, filed on May 11, 2010.

(51) Int. Cl.
*H02M 5/14* (2006.01)
*H02M 5/293* (2006.01)

(52) U.S. Cl.
CPC ....................................... *H02M 5/14* (2013.01)

(58) Field of Classification Search
CPC ......... H02M 5/00; H02M 5/14; H02M 5/293; H01F 30/14
USPC ......... 363/148, 149, 152, 153, 154, 155, 156, 363/9, 10; 323/212, 215
See application file for complete search history.

(56) References Cited

U.S. PATENT DOCUMENTS

| | | | |
|---|---|---|---|
| 4,100,596 A | | 7/1978 | Olafson et al. |
| 4,618,809 A | | 10/1986 | Maeda |
| 4,644,241 A | | 2/1987 | Maeda |
| 4,777,421 A | * | 10/1988 | West ............................. 318/768 |
| 4,899,268 A | * | 2/1990 | Hollinger ......................... 363/4 |
| 4,908,744 A | | 3/1990 | Hollinger |
| 5,272,616 A | | 12/1993 | Divan et al. |
| 5,402,053 A | * | 3/1995 | Divan et al. ................... 318/768 |

(Continued)

FOREIGN PATENT DOCUMENTS

| | | |
|---|---|---|
| AU | 2006329365 | 7/2007 |
| SU | 764061 | 6/1975 |

OTHER PUBLICATIONS

First Examination Report issued upon corresponding New Zealand Patent Application No. 604016 on Jul. 12, 2013.

(Continued)

*Primary Examiner* — Gary L Laxton
(74) *Attorney, Agent, or Firm* — Fleit Gibbons Gutman Bongini & Bianco PL; Martin Fleit; Paul D. Bianco

(57) ABSTRACT

Methods and apparatus for converting a single phase power supply source into a three phase power supply source. The single phase power supply source is utilized as a first output of the three phase power supply source, while the second and third outputs of the three phase power supply source are created utilizing part of the single phase power supply source combined with a phase shifting inverting circuit.

16 Claims, 7 Drawing Sheets

(56) References Cited

U.S. PATENT DOCUMENTS

| | | | |
|---|---|---|---|
| 5,545,965 A * | 8/1996 | Smith | 318/768 |
| 5,969,957 A | 10/1999 | Divan et al. | |
| 6,275,405 B1 | 8/2001 | Pernyeszi | |
| 6,297,971 B1 | 10/2001 | Meiners | |
| 6,831,849 B2 | 12/2004 | Fowler et al. | |
| 8,064,232 B2 | 11/2011 | Mechi | |
| 2009/0034305 A1 | 2/2009 | Mechi | |

OTHER PUBLICATIONS

Ouyang, F., et al. "Research on a single-phase to three-phase power supply method based on balance transformer" Transactions of China Electrotechnical Society. vol. 23, No. 9, pp. 132-137. Sep. 2008, Abstract, figures 1, 2 Sections 2, 3.2 and 4.1, Equation 5.

Malengret, M. et al. "Applying Parks Transformation to a Single to Three Phase Convertor" IEEE Power Electronics Specialists Conference, 26th Annual IEEE PESC vol. 2 Jun. 18-22, 1995 pp. 985-989, Introduction Figures 2, 4, 6, 8.

Bellar, M.D. et al. "Comparative analysis of single-phase to three-phase converters for rural electrification" IEEE International Symposium on Industrial Electronics, 2004 Issue Date: May 4-7, 2004, vol. 2, on pp. 1255-1260, Figure 12.

International Search Report (ISR) published Nov. 17, 2011 for International Patent Application No. PCT/AU2011/000545 filed on May 11, 2011.

Written Opinion (WO) published Nov. 11, 2012 for International Patent Application No. PCT/AU2011/000545 filed on May 11, 2011.

International Preliminary Report on Patentability (IPRP) published Nov. 13, 2012 for International Patent Application No. PCT/AU2011/000545 filed on May 11, 2011.

First Examination Report issued upon corresponding Australian Patent Application No. 2011252753 on Mar. 17, 2014.

Terry Cockerill, Harris Impressed by Phase TEchnologies, Radio World, Dec. 16, 2009.

Notice of Acceptance issued in connection with corresponding New Zealand Patent Application No. 604016, Jan. 23, 2015.

Published specification, as accepted, for corresponding New Zealand Patent Application No. 604016, Jan. 30, 2015.

First Examination Report, Jan. 28, 2015, for New Zealand Divisional Patent Application No. 703741.

\* cited by examiner

METHODS AND APPARATUS FOR SUPPLYING THREE PHASE POWER

TECHNICAL FIELD

The present invention relates generally, to methods and apparatus for supplying three phase power, and relates particularly, though not exclusively, to methods and apparatus for converting single phase power into three phase power.

In accordance with preferred aspects only, the methods and apparatus of the present invention are particularly suited to producing three phase, three or four wire, power supply systems from existing or new 'Single Wire Earth Return' (hereinafter simply referred to as "SWER") power supply systems, and/or, other single phase power supply systems (particularly, though not exclusively, 'Two Phase Two Wire', single phase systems).

It will be convenient to hereinafter describe the invention in relation to SWER and/or other single phase (in particular, 'Two Phase Two Wire') power distribution systems, however it should be appreciated that the present invention is not limited to that use only. The methods and apparatus of the present invention may also enable other suitable forms of single phase power to be converted to three phase power without departing from the spirit and scope of the invention as hereinafter described. Accordingly, throughout the ensuing description the expressions "single phase", "SWER", "Two Phase Two Wire", etc, is/are intended to refer to any suitable form of single phase power that could be converted to three phase power in accordance with the teachings of the invention.

BACKGROUND ART

Any discussion of documents, devices, acts or knowledge in this specification is included to explain the context of the invention. It should not be taken as an admission that any of the material forms a part of the prior art base or the common general knowledge in the relevant art in the United States, Australia, or elsewhere on or before the priority date of the disclosure herein.

Electricity generation, transmission, distribution and consumption, is ideally by way of three phase systems. These systems generally comprise high and very high voltages in order to transmit the electrical energy in a cost effective manner. End consumers are generally connected to a low voltage distribution supply voltage of less than 1000V, which is achieved by way of step-down transformers installed at various locations along the supply chain.

In areas having relatively small consuming loads, connection to the distributor may be by way of a single phase system having, for example, two wires. Alternatively, there may be two or three phase power available via three or four wire connections to end users.

In relatively large geographical areas, with known relatively small loads, and no, or low, demand growth anticipation, the high/medium voltage distribution may be supplied by medium or high voltage single phase systems, known as: single phase (two "actives" only); or, SWER; or, by Dual SWER systems.

SWER systems are favoured over other supply systems in many jurisdictions including Australia, New Zealand, Canada, Brazil and South Africa, as they are more economical and only require as little as a single aerial wire—the electrical loop being completed by a convenient 'earth return' system utilising earth rods embedded into the ground at various locations along the supply chain.

There are of course many circumstances where it is required, or at least desired, to operate a three phase load, such as a three phase motor, in remote or rural areas where only, for example, conventional 120-volt or 240-volt single phase power is available. For example, rural properties such as dairy farms often require loads bigger than 3 kW, for operating pumps, refrigeration units, air conditioning systems, etc. However, if such properties are only supplied with power via, for example, a (single) SWER system, three phase power is not available unless suitable three phase conversion systems can be readily provided.

Furthermore, as electricity supply is regulated in most countries, the electricity industry's main concern is to provide continuous reliable supply. In addition to the reliability of supply, another major concern is for the supply to be within the specified parameters of power quality standards, i.e. stable voltage levels within certain limits; VTHD (Voltage Total Harmonic Distortion) within strict limits; and/or, other quality parameters. These standards generally apply to all supply systems, whether single or multiple phase. Hence, whether end users of three phase power draw balanced or imbalanced power from a distribution network is of utmost importance. As a result of this, three phase consumers are often connected via four wire three phase systems for network stability.

All of the abovementioned electrical supply systems are in the form of alternating current ("AC") systems. For AC systems, as current alternates in time, the directions of the phases keep on changing, hence this change of vector direction in time is commonly termed "Phasor". For three phase systems, the respective phasors can be described as follows:

$$Va = A*\sin(\omega t + 0°); \quad (a)$$

$$Vb = B*\sin(\omega t + 120°); \quad (b)$$

$$Vc = C*\sin(\omega t + 240°); \quad (c)$$

Where; $\omega t + 0°$ describes an angle that keeps changing in time with an offset of 0° from a known reference; $\omega t + 120°$ describes an angle that keeps changing in time with an offset of 120° from the same known reference; and, $\omega t + 240°$ describes an angle that keeps changing in time with an offset of 240° from the same known reference. The frequency of alternations is determined by $\omega$ (radians/sec); and A, B, & C represent the amplitude of the voltage value. In this example A=B=C=Unity.

The shape of these phasors (i.e. Va, Vb, Vc) and the angle references (i.e. (a),(b),(c)) can be seen in FIGS. 3 & 4, which will be described in further detail later in this description.

It should be apparent from the above discussion that if a three phase power supply is to be produced from a single phase source then two phases must be reconstructed. For example, if Va is given, Vb and Vc will need to be reconstructed.

Conversion systems exist for operating three phase induction motors in single phase environments. For example, U.S. Pat. No. 4,618,809, to Naoyuki Maeda, describes an inverter apparatus for converting a single phase AC power supply into a three phase AC power supply for operating a three phase motor. Although successful at producing a three phase supply for operating an induction motor, this solution has many limitations, the most notable of which is the use of a household AC supply source which is not referenced to a common neutral, and hence, which does not readily allow the generated additional phases to be utilised as separate single phases.

Further examples of similar convertor apparatus include: U.S. Pat. No. 4,644,241, also to Naoyuki Maeda; U.S. Pat.

No. 4,908,744, to Thomas G. Hollinger; U.S. Pat. No. 5,969,957, to Divan, et al.; AU Patent No. 2006329365, to Abdallah Mechi; U.S. Pat. No. 5,272,616, to Divan, et al.; U.S. Pat. No. 6,297,971, to Larry G. Meiners; and, U.S. Pat. No. 6,831,849, to Fowler, et al.

For many reasons the solutions proposed in these citations are also considered to be insufficient for producing reliable and/or useful three phase power supplies. Like Maeda's first U.S. patent (U.S. Pat. No. 4,618,809), none of these additional solutions disclose or suggest the use of a common neutral. Many electricity distribution companies utilise a common neutral as the fourth wire in a three phase distribution system for network stability, as was described above. Hence, none of these solutions could readily be integrated into such four wire three phase systems.

Aside from the above conversion systems for operating three phase induction motors in single phase environments, other systems for simply converting a single phase supply into a three phase supply are available. Such solutions typically use one of two methods for conversion, these being, the coil-capacitor method, or the three phase electric motor method.

As the name suggests, the coil-capacitor method reconstructs the second and third phases using coils and capacitors. The additional coils raise the voltage, whilst the capacitors are used to shift the phase. This method is limited to specific loads, and has to be adjusted when load impedance is changed. Hence, this method is not ideal for producing a stable three phase supply.

The three phase electric motor method uses the motor to construct the required three phases as the rotating motor acts like a generator. However, as the power capacity is determined by the size of the electric motor, this solution again has limited usage in electricity distribution supply chains.

A need therefore exists for alternative and/or improved methods and apparatus for converting a single phase power supply source into a three phase power supply.

DISCLOSURE OF THE INVENTION

According to one aspect of the present invention there is provided a method of converting a single phase power supply source into a three phase power supply source, said method including the steps of: utilising said single phase power supply source as a first output of said three phase power supply source; and, creating a second and third output of said three phase power supply source utilising part of said single phase power supply source combined with a phase shifting inverting circuit.

Preferably said three phase power supply source is a four wire source including a common neutral.

Preferably said phase shifting inverting circuit generates 0.866 of the unity voltage required.

Preferably a first transformer having a single primary and at least one secondary is utilised in combination with said phase shifting inverting circuit to produce said three phase power supply source.

Preferably said phase shifting inverting circuit generates its output at 90°.

Preferably at least one additional transformer with a centre tap to produce outputs of 90° and 270° respectively.

Preferably said first transformer includes two secondaries cascaded or paralleled with at least one power supply source having predetermined amplitude and phase shift for creating said second and third outputs of said three phase power supply source.

In a practical preferred embodiment, said at least one power supply source is said single phase power supply source. In an alternative practical preferred embodiment, said at least one power supply source is an external supply source, separate to that of said single phase power supply source.

Preferably said single phase power supply source is selected from the group consisting of: a single phase SWER supply source; a single phase, 'Two Phase Two Wire', supply source; a single phase electricity distribution supply source; local or remote generators; wind, solar or wave energy sources; chemical or mechanical supply sources; or, any other suitable energy source that can be converted to a single phase electricity supply source.

In embodiments where said external supply source is separate to that of said single phase power supply source it is preferred that said external supply source is selected from the group consisting of: a single phase SWER supply source; a single phase, 'Two Phase Two Wire', supply source; a single phase electricity distribution supply source; local or remote generators; wind, solar or wave energy sources; chemical or mechanical supply sources; or, any other suitable energy source that can be converted to a single phase electricity supply source.

According to a further aspect of the present invention there is provided an apparatus for converting a single phase power supply source into a three phase power supply source, said apparatus including: a first transformer having a single primary and at least one secondary, said primary being supplied by said single phase power supply source and said at least one secondary producing a first output of said three phase power supply source; a phase shifting inverting circuit combined with said first transformer for creating a second and third output of said three phase power supply source utilising only part of said single phase power supply source.

Preferably said three phase power supply source is a four wire source including a common neutral.

Preferably said phase shifting inverting circuit generates 0.866 of the unity voltage required.

Preferably said phase shifting inverting circuit generates its output at 90°.

Preferably at least one additional transformer with a centre tap is used to produce outputs of 90° and 270° respectively.

Preferably said first transformer includes two secondaries cascaded or paralleled with at least one power supply source having predetermined amplitude and phase shift for creating said second and third outputs of said three phase power supply source.

In a practical preferred embodiment, said at least one power supply source is said single phase power supply source. In an alternative practical preferred embodiment, said at least one power supply source is an external supply source, separate to that of said single phase power supply source.

Preferably said single phase power supply source is selected from the group consisting of: a single phase SWER supply source; a single phase, 'Two Phase Two Wire', supply source; a single phase electricity distribution supply source; local or remote generators; wind, solar or wave energy sources; chemical or mechanical supply sources; or, any other suitable energy source that can be converted to a single phase electricity supply source.

In embodiments where said external supply source is separate to that of said single phase power supply source it is preferred that said external supply is selected from the group consisting of: a single phase SWER supply source; a single phase, 'Two Phase Two Wire', supply source; a single phase electricity distribution supply source; local or remote generators; wind, solar or wave energy sources; chemical or mechanical supply sources; or, any other suitable energy source that can be converted to a single phase electricity supply source.

These and other essential or preferred features of the present invention will be apparent from the description that now follows.

BRIEF DESCRIPTION OF THE DRAWINGS

In order that the invention may be more clearly understood and put into practical effect there shall now be described in detail preferred constructions of methods and apparatus for supplying three phase power in accordance with the invention. The ensuing description is given by way of non-limitative example only and is with reference to the accompanying drawings, wherein.

MODES FOR CARRYING OUT THE INVENTION

In accordance with a preferred embodiment, the present invention relates to the conversion of a single electrical phasor into multiple electrical phasors, in particular into three phasors, 120° or so, electrically apart with or without a common Neutral. The single phase supply source is preferably an existing or new SWER system, or a single phase, 'Two Phase Two Wire', supply system, but suitable single phase power supply sources include, but are not limited to: electricity distribution supply systems; local or remote generators; wind, solar or wave energy sources; chemical or mechanical supply systems; and/or, any other suitable energy source that can be converted to a single phase electricity source. Although it is preferred that the present invention utilises an existing or new SWER power supply system, and/or, a single phase, 'Two Phase Two Wire', power supply system, to produce a three phase power supply, it should be appreciated that new or other single phase supply systems could also be converted to three phase in accordance with the present invention. The invention should therefore not be construed as limited to the specific examples provided.

Figures 1, 2:
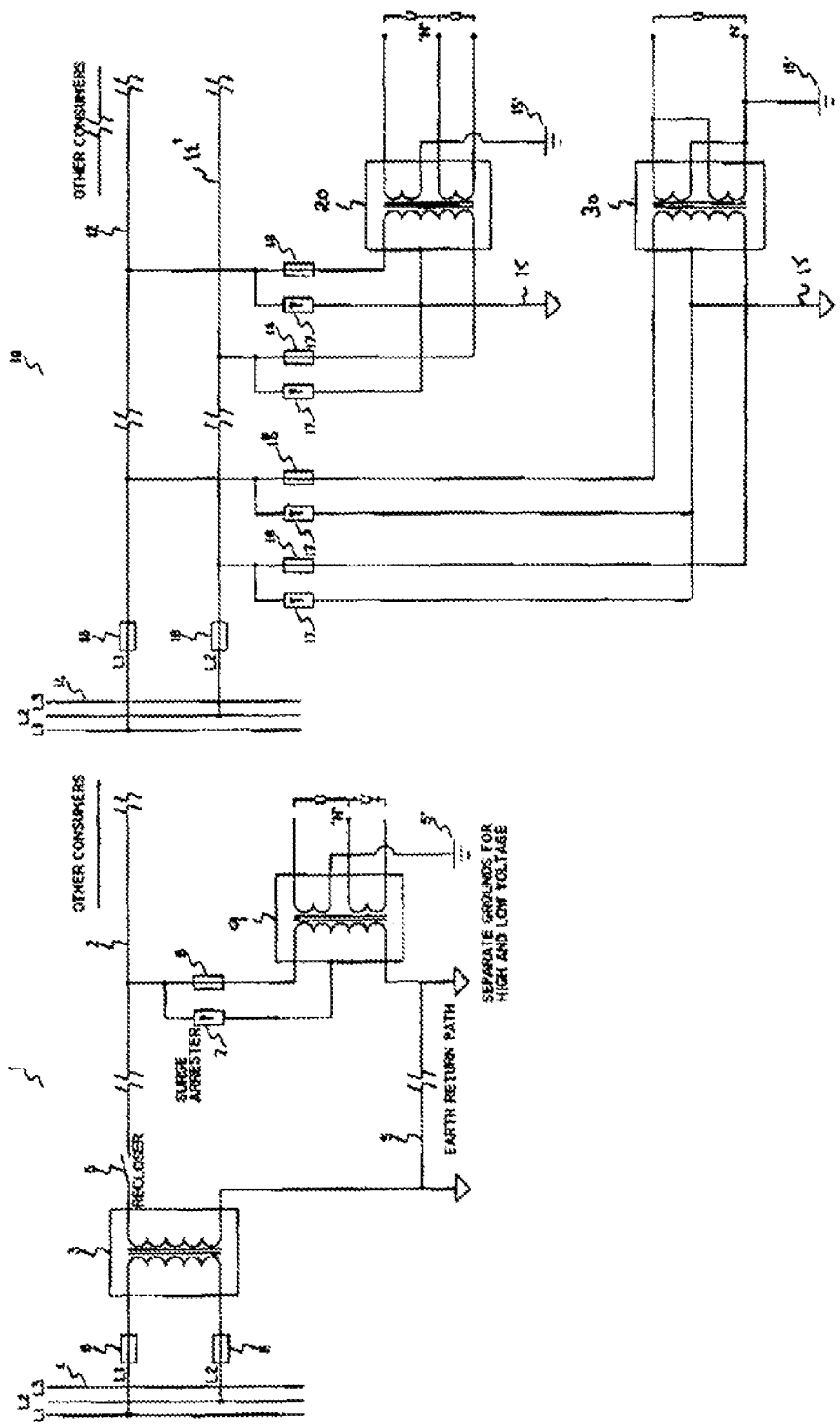
FIG. 1 is a schematic circuit diagram illustrating a conventional single SWER power supply system.
FIG. 2 is a schematic circuit diagram illustrating a conventional single phase, 'Two Phase Two Wire', power supply system.

As already mentioned at the outset of this description, SWER systems are used extensively in many jurisdictions, particularly to supply electricity to remote or rural areas. A schematic circuit diagram of a typical single SWER system 1 is shown in FIG. 1. This Figure shows the use of a SWER transformer 9 that has a single primary and dual secondaries—where the secondaries are connected in a U-N-U configuration, i.e. U & U are 180 degrees apart, in relation to Neutral point ('N').

Referring to FIG. 1, it can be seen that for single SWER system 1, power is supplied to the SWER line 2 by an isolating transformer 3, usually of up to 300 kVA. This transformer 3 isolates the grid 4 from ground or earth 5, and changes the grid voltage (typically 22 or 33 kV line to line—of course other voltages may be used) to the SWER voltage (typically 12.7 or 19.1 kV line to earth—again, other voltages may be used). SWER line 2 is a single conductor that may stretch for tens or even hundreds of kilometers or miles (as represented by the breaks in SWER line 2 and earth return path 5), with a number of distribution transformers 9 along its length. At each transformer 9, such as at a consumer's premises, current flows from line 2, through the primary coil of the step-down transformer 9, to earth 5 through an earth stake (not shown). From the earth stake, the current eventually finds its way back to the main isolating transformer 3 at the head of the line, completing the circuit. The secondary windings of distribution transformer 9 will then supply the consumer with either single ended single phase (U-0 or U-N) power, or split phase (U-0-U or U-N-U) power, in the regions standard appliance voltages, with the '0' or 'N' volt line connected to a safety earth 5' that does not normally carry an operating current.

What is also shown in FIG. 1 for illustrative purposes is a number of additional components that are typically used for safety reasons in conventional SWER systems 1. Such additional components may include: recloser 6; surge arrestor 7; and, fuses 8—such as high-rupture capacity (HRC) fuses.

Figure 4:
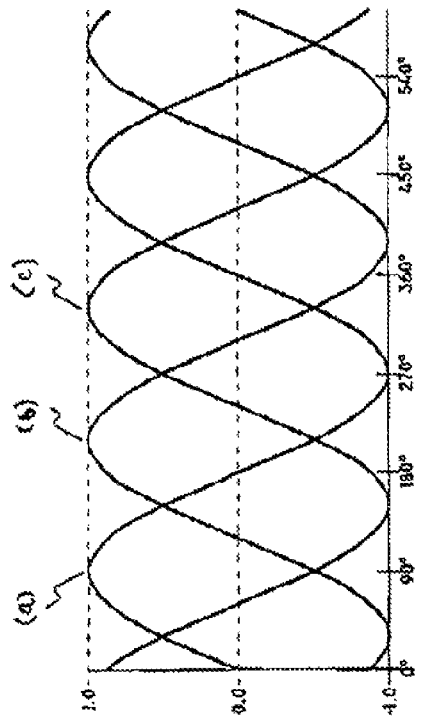
FIG. 4 is a graph representing the angle references of the three phasors represented in the phasor diagram of FIG. 3, and hence, the angle references of the three phase supply that can be produced in accordance with preferred embodiments of the present invention, again utilising, for example, either of the single phase supplies of FIGS. 1 & 2.
Figure 6:
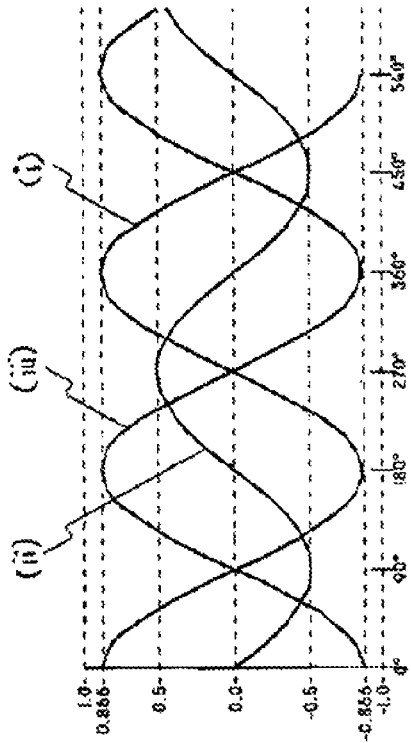
FIG. 6 is a graph representing the angle references of the three phasors represented in the phasor diagram of FIG. 5, and hence, the angle references of the three phase supply that can be produced in accordance with a preferred embodiment of the present invention.
Figure 3:
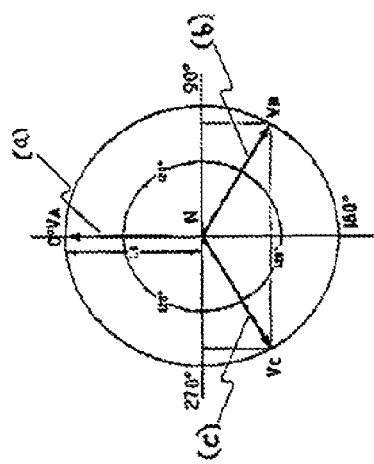
FIG. 3 is a phasor diagram illustrating three phasors that can be produced in accordance with preferred embodiments of the present invention, utilising, for example, either of the single phase supplies of FIGS. 1 & 2.
Figure 5:
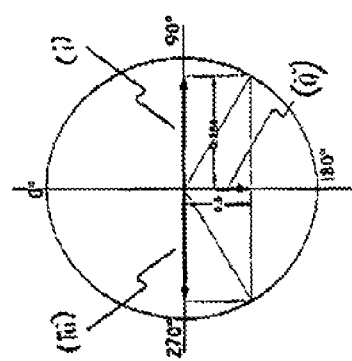
FIG. 5 is a phasor diagram illustrating how three phasors can be reconstructed from a single phase source in accordance with a preferred embodiment of the present invention.

When transformer 9 has a voltage applied across its primary winding, two secondary voltages are produced across the secondary coils of transformer 9. This results in the generation of a single phase power supply which may be illustrated by the single phasor Va (or, (a)) shown in the phasor diagram of FIG. 3 (or angle references of FIG. 4).

In accordance with one preferred embodiment, the present invention may utilise this existing (or new) single SWER power supply 1 to produce a three phase power supply that can readily be distributed to consumers in remote or rural areas. As will be described in further detail below, other power source supplies, such as, for example, electricity distribution or solar power supplies, etc, may be used instead of, or in conjunction with, SWER system 1 in order to generate a three phase power supply in accordance with preferred embodiments of the invention.

As already discussed, other single phase supply sources may be used in accordance with the invention. A suitable alternative preferred source is a single phase, 'Two Phase Two Wire' supply system (10). A schematic circuit diagram of a typical single phase, 'Two Phase Two Wire', supply system 10 is shown in FIG. 2. This Figure shows the use of two distribution transformers (20,30) that have single primaries and dual secondaries—where the secondaries are connected in a: U-N-U configuration, i.e. U & U are 180 degrees apart, in relation to Neutral point ('N'), or U-N configuration, respectively.

Referring to FIG. 2, wherein like reference numerals to those used to described SWER system 1 are used to denote like parts or components of single phase system 10, it can be seen that for single phase system 10, power is supplied to (two) lines 12,12' directly from grid 14. Each of transformers 20,30 is then wired as shown to provide either a U-N-U (transformer 20), or U-N (transformer 30) configuration.

In accordance with a second preferred embodiment, the present invention may utilise this existing (or new) single phase, 'Two Phase Two Wire', power supply 10 to produce a three phase power supply that can readily be distributed to consumers in remote or rural areas. As will be described in further detail below, other power source supplies, such as, for example, electricity distribution or solar power supplies, etc, may be used instead of, or in conjunction with, single phase system 10 in order to generate a three phase power supply in accordance with preferred embodiments of the invention.

As was mentioned earlier, with such single phase SWER systems (1), and/or single phase, 'Two Phase Two Wire', systems (10), in order to get three phases, two phases must be reconstructed.

Mathematical proof of preferred inventive concepts of the invention will be provided hereinafter, however before providing that proof, some principles of transformer theory will be discussed in detail as follows.

The basic concept of an electrical transformer is to have at least one primary winding and at least one secondary winding, wrapped around one closed loop magnetic core. When an alternating supply (AC) is connected to the primary, it creates alternating magnetic flux $\phi$ that induces potential on the secondary's windings terminals.

With three phase systems, three single phase transformers can be built on one magnetic core that has three limbs. This can be achieved due to the fact that the total three phase flux equals zero.

In accordance with the present invention, in order to convert one given electrical phasor into three phasors using, for example, either of the single phase supply sources 1,10 of FIGS. 1 & 2, on their own, or in combination with other suitable supply sources, a single phase transformer with one primary winding wrapped around a magnetic core, and one, but preferably two, secondary windings on the same core may be utilised (see, for example, the preferred circuit embodiments shown in FIGS. 7 to 11). The secondaries can be arranged in either a cascaded or paralleled configuration. The second and third phases (Vb,Vc) are then reconstructed using one of the secondaries, cascaded with one or two external sources that are predetermined with amplitude and phase shift, so that each combination provides a new amplitude and the phase is shifted to achieve around 120° separation with the same magnitude of amplitude.

With many existing converters, all of the AC electrical energy input is rectified into DC, and then transformed into three phase AC by various means. In accordance with preferred embodiments of the present invention, the only transformation required is about 50% of the input energy. One of the three phase outputs (e.g. Va) is actually the single phase input, and the remaining two outputs (e.g. Vb,Vc) are constructed partially by the input phase (e.g. Va), combined with an artificial phase shifting inverter.

One major advantage of utilizing this inventive concept is that if the inverter fails, the input phase supply (e.g. Va) is still connected as one of the outputs, hence continuity of the single phase supply is unaffected. Accordingly, this phase (e.g. Va) may be designated as an essential supply for consumers' essential loads.

Referring again to FIGS. 3 & 4, and the phasors Va, Vb & Vc, represented in those Figures (i.e. (a), (b) & (c) in both FIGS. 3 & 4), in accordance with a preferred embodiment of the present invention, the concept of phasor reconstruction may be provided by the following trigonometric equations (proof):

Assuming Va is given, Vb and Vc must be reconstructed to provide a three phase supply. In accordance with the invention, Phasor Vb can be represented by two perpendicular components:

Vbx and Vby, where the value of Vbx is:

$$Vbx = \cos(30) * Vb * \sin(wt+90°); \text{ and}$$

$$Vby = \sin(30) * Vb * \sin(wt+180°). \text{ Hence:}$$

$$Vbx = 0.866 * Vb * \sin(wt+90°); \text{ and}$$

$$Vby = 0.5 * Vb * \sin(wt+180°).$$

The same works for Vc. That is, Phasor Vc can be represented by two perpendicular components:

Vcx and Vcy, where the value of Vcx is:

$$Vcx = \cos(30) * Vc * \sin(wt+270°); \text{ and}$$

$$Vcy = \sin(30) * Vc * \sin(wt+180°). \text{ Hence:}$$

$$Vcx = 0.866 * Vc * \sin(wt+270°); \text{ and}$$

$$Vcy = 0.5 * Vc * \sin(wt+180°).$$

For the purpose of the explanation, Va=Vb=Vc=Unity.
The conclusions drawn from the above equations are:
Vby equals Vcy equals 0.5*Vc*sin(wt+180°); and
Vbx amplitude equals Vcx amplitude, however in opposite directions.

Preferred Circuit Embodiments:

In FIGS. 7 to 11, various practical preferred circuits (100, 200,300,400,500) are provided for producing a three phase power supply from one or more single phase supply source(s), each utilising the novel phasor reconstruction principles provided hereinabove. Although various practical circuit embodiments (100,200,300,400,500) are provided herein, it should be appreciated that same are only an example of the types of circuits that can be constructed in accordance with the invention in order to realise the novel phasor reconstruction principles provided above. Of course other practical hardware implementations could also be used. Accordingly, the present invention should not be construed as limited to the specific examples provided herein.

Figure 7:
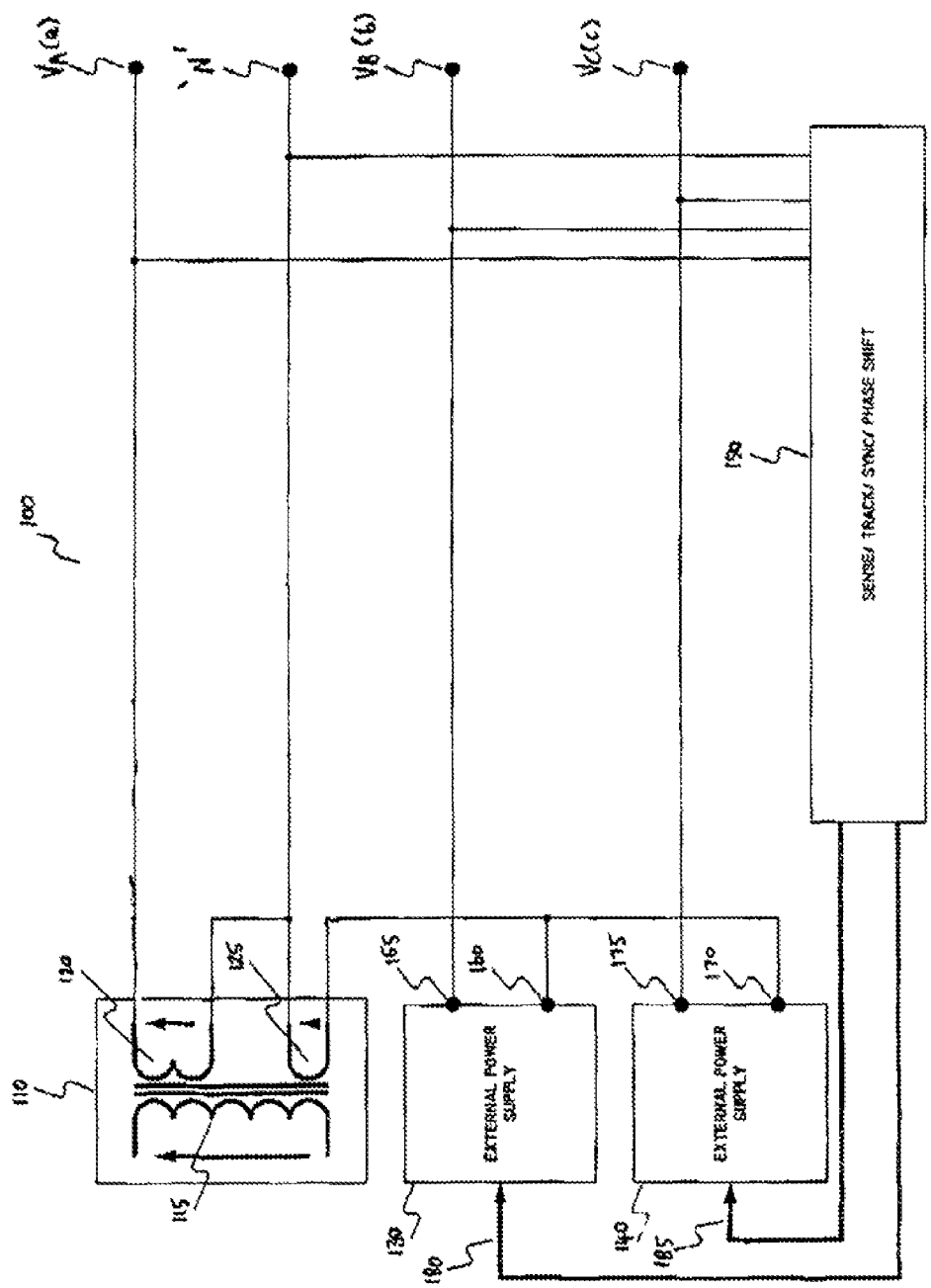
FIG. 7 is a schematic diagram of a first preferred circuit that can be used to produce a three phase power supply in accordance with the present invention; and, FIGS. 8 to 11 are schematic diagrams of further preferred circuits that can each also be used to produce a three phase power supply in accordance with the invention.

In FIG. 7 there is shown a first preferred circuit 100 that may be used in accordance with the present invention to produce a three phase power supply from a single phase source. This preferred circuit 100 utilises a single phase transformer 110 that has a primary 115; a first secondary 120 that has an amplitude of unity, and second secondary 125 that has an amplitude of half of unity. FIGS. 3 to 6 show the respective phasors and angle references produced by preferred circuit 100. More particularly: in FIGS. 3 & 4, Va or (a) represents the unity output phasor from transformer 110; in FIGS. 5 & 6, (ii) is the half unity phasor produced by second secondary 125 of transformer 110; again in FIGS. 5 & 6, (i) is the potential between the terminals 160 & 165 of a first external power supply 130, which is 0.866 of the unity value, at 90°, with reference to Va or (a) of FIGS. 3 & 4; and, yet again in FIGS. 5 & 6, (iii) is the potential between terminals 170 & 175 of a second external power supply 140, which is 0.866 of the unity value, at 270°, with reference to Va or (a) of FIGS. 3 & 4.

As can be seen in the preferred circuit 100 embodiment shown in FIG. 7, both external power supplies 130,140 are controlled by an inverter controller box 150, via control lines 180 & 185 respectively, for amplitude and phase shift, by sensing all three phase outputs Va (a), Vb (b), Vc (c), and common Neutral 'N'.

By connecting the output of second secondary 125, of transformer 110, to both terminals 160 & 170 of external power supplies 130 & 140, the phasor summation produces the potentials at 165 & 175 as outputs Vb (b) and Vc (c) respectively.

As can be seen in FIG. 7, preferred circuit 100 has an input 115 (to transformer 110) from a power supply source (which may be either of single phase supply sources 1,10 described above with reference to FIGS. 1 & 2, or any other suitable supply source), and two independent floating outputs provided by external supply power supplies 130,140. One output 160,165, supplies a potential of: Vout=0.866*V*sin(wt+90°), whilst the other output 170,175, supplies a potential of: Vout=0.866*V*sin(wt+(180+90)°).

External power supplies 130,140 can be any suitable supply source including SWER system 1, single phase system 10 (e.g. Two Phase Two Wire), or any other suitable source as described above. Alternatively, external power supplies 130, 140, could simply be self-supplied by transformer 110 of preferred circuit 100.

The combined circuit 100 of transformer 110 and inverter controller box 150 produces an electricity supply of three phases, 120° or so separated, and a common Neutral ('N'). Refer again to FIGS. 3 & 4 for the respective phasors and angle references produced (i.e. Va (a), Vb (b), Vc (c)).

A critical issue with electricity supply is its power quality. For this reason inverter controller box 150 includes a number of components to ensure that the resultant three phase supply is reliable and stable.

A 90° phase shifter is preferably utilised within inverter controller box 150 to provide phase angle balance. The phase shifter is preferably Phase Locked Loop (PLL) with the input/output phase Va (a), hence any internal phase shift (due to, for example, the windings impedance phase shift) is compensated by the PLL.

Most of the preferred converting circuit 100 of FIG. 7 is actually a normal transformer (110), hence the contribution of THD ("Total Harmonic Distortion") is like any other transformer. The remaining electronic components can include an active rectifier (see, for example, item 335 in FIG. 9) that minimises harmonic distortion, along with line filters within the active rectifier (again, item 335 in FIG. 9) on its input and output.

The output voltage from the inverter controller box 150 is 0.866 of the unconverted phase voltage, and tracking. This means that for any voltage change of the unconverted source phase Va, the output of the inverter controller box 150 tracks with its output voltage and the actual phase shift in a way that the output voltage of the reconstructed phases (i.e. Vb,Vc) will keep their voltage and phase angle balanced.

Figure 8:
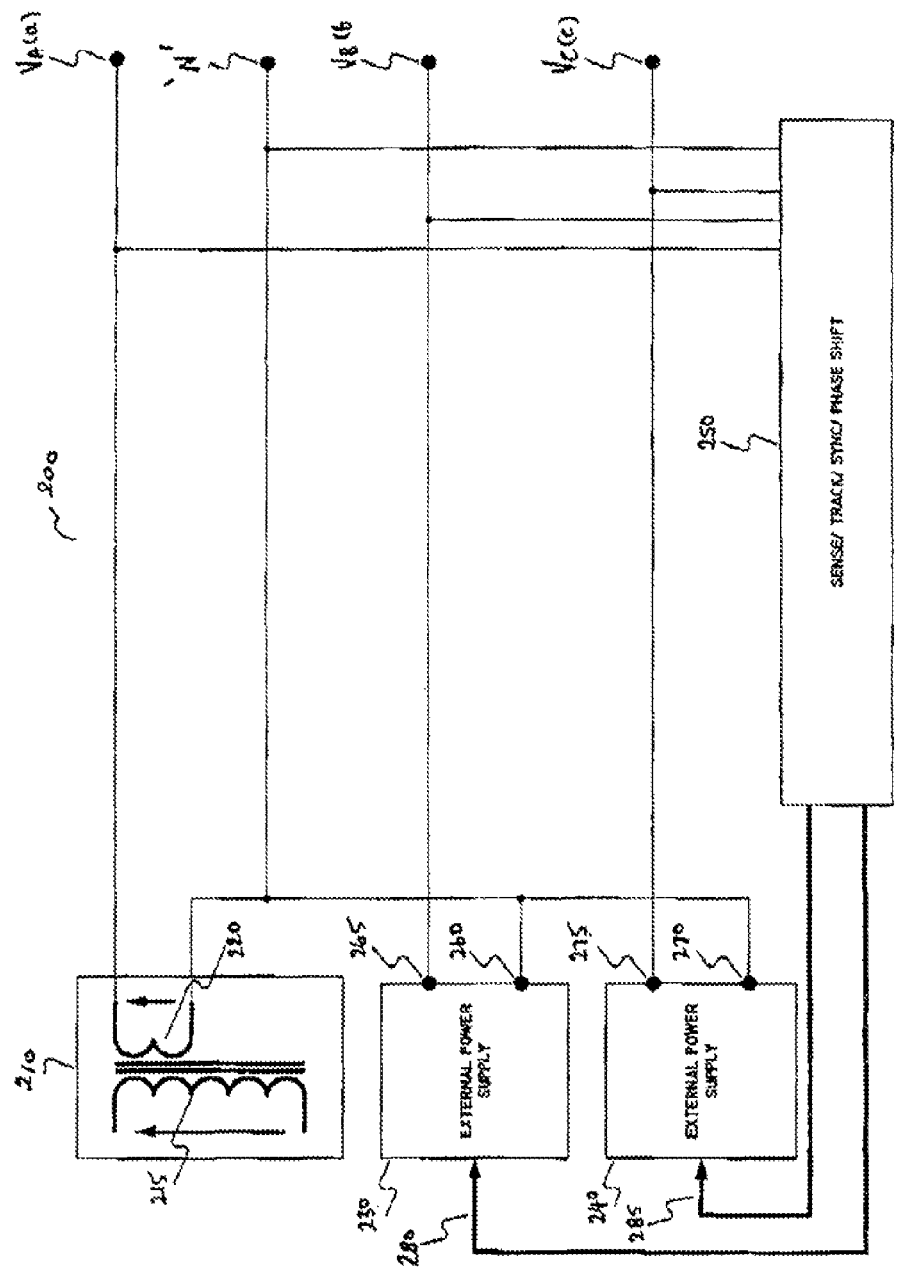

In FIG. 8 there is shown a second preferred circuit 200 that may also be used in accordance with the present invention to produce a three phase power supply from one or more single phase source(s). In FIG. 8, like reference numerals to those used in FIG. 7 to described first preferred circuit 100 are used to denote like parts of second preferred circuit 200. Second preferred circuit 200 of FIG. 8 is very similar to that of first preferred circuit 100 shown in FIG. 7, and only differs with respect to transformer 210. That is, transformer 210 only has one secondary 220. This results in an output potential at terminals 260,265, of first external power supply 230, of unity voltage at 120°, and an output potential at terminals 270,275, of second external power supply 240, of unity voltage at 240°.

Figure 9:
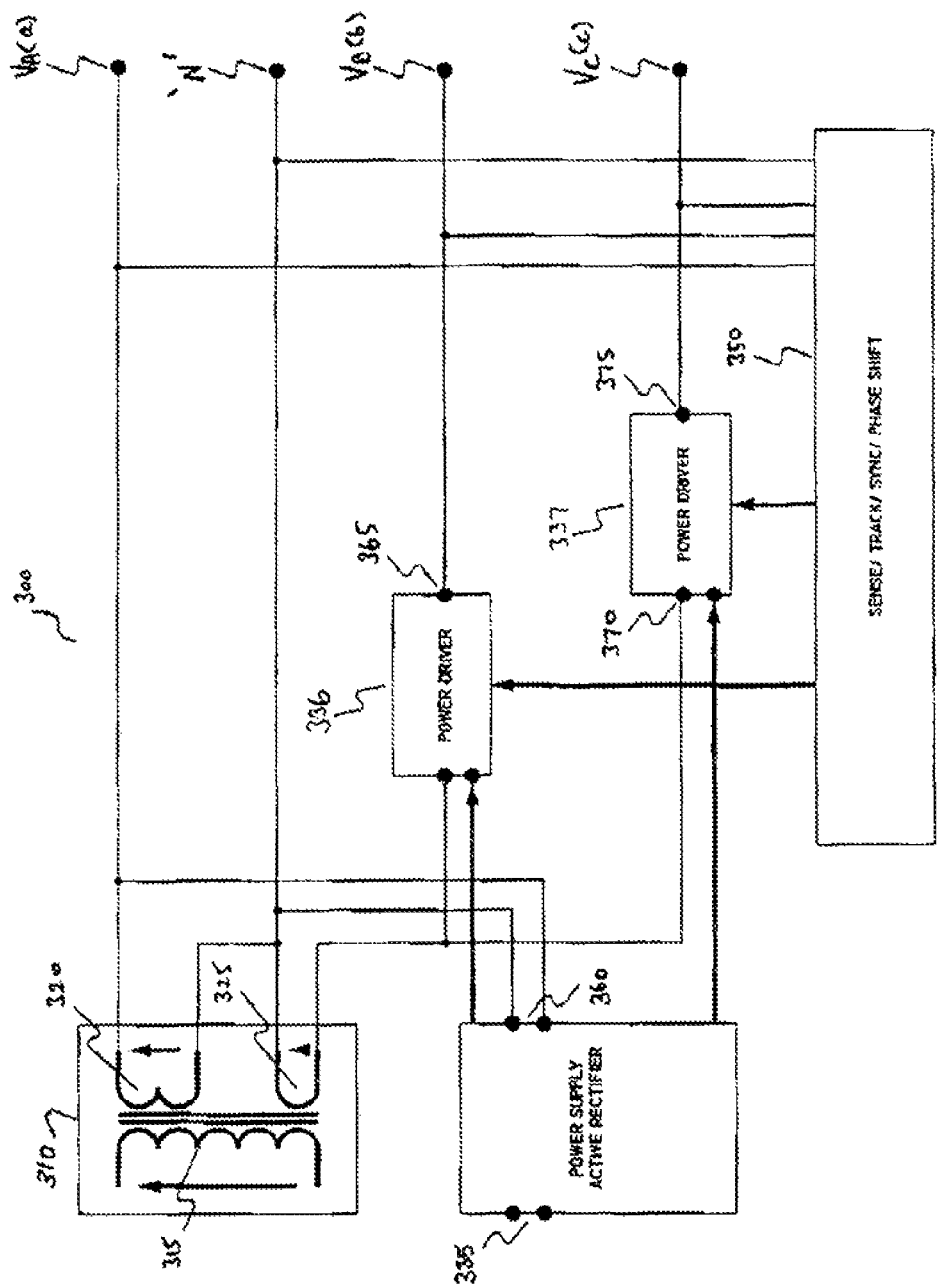

In FIG. 9 there is shown a third preferred circuit 300 that may also be used in accordance with the present invention to produce a three phase power supply from one or more single phase source(s). In FIG. 9, like reference numerals to those used in FIGS. 7 & 8 to describe the first and second preferred circuits 100,200 are used to denote like parts of the third preferred circuit 300. Third preferred circuit 300 of FIG. 9 is again similar to that of first preferred circuit 100 shown in FIG. 7, and only differs with respect to the external power supplies. That is, in preferred circuit 300 instead of having two external power supplies (e.g. 130,140 in FIG. 7), circuit 300 now includes three separate blocks 335,336,337. A first block 335 is an efficient power supply containing an active rectifier. The second and third blocks 336,337 are inverters which each produce 0.866 unity potential, at 90° and 270° respectively. Both are commonly connected to transformer (310) secondary 325 which then creates the output potential Vb (b) and Vc (c) respectively.

Figure 10:
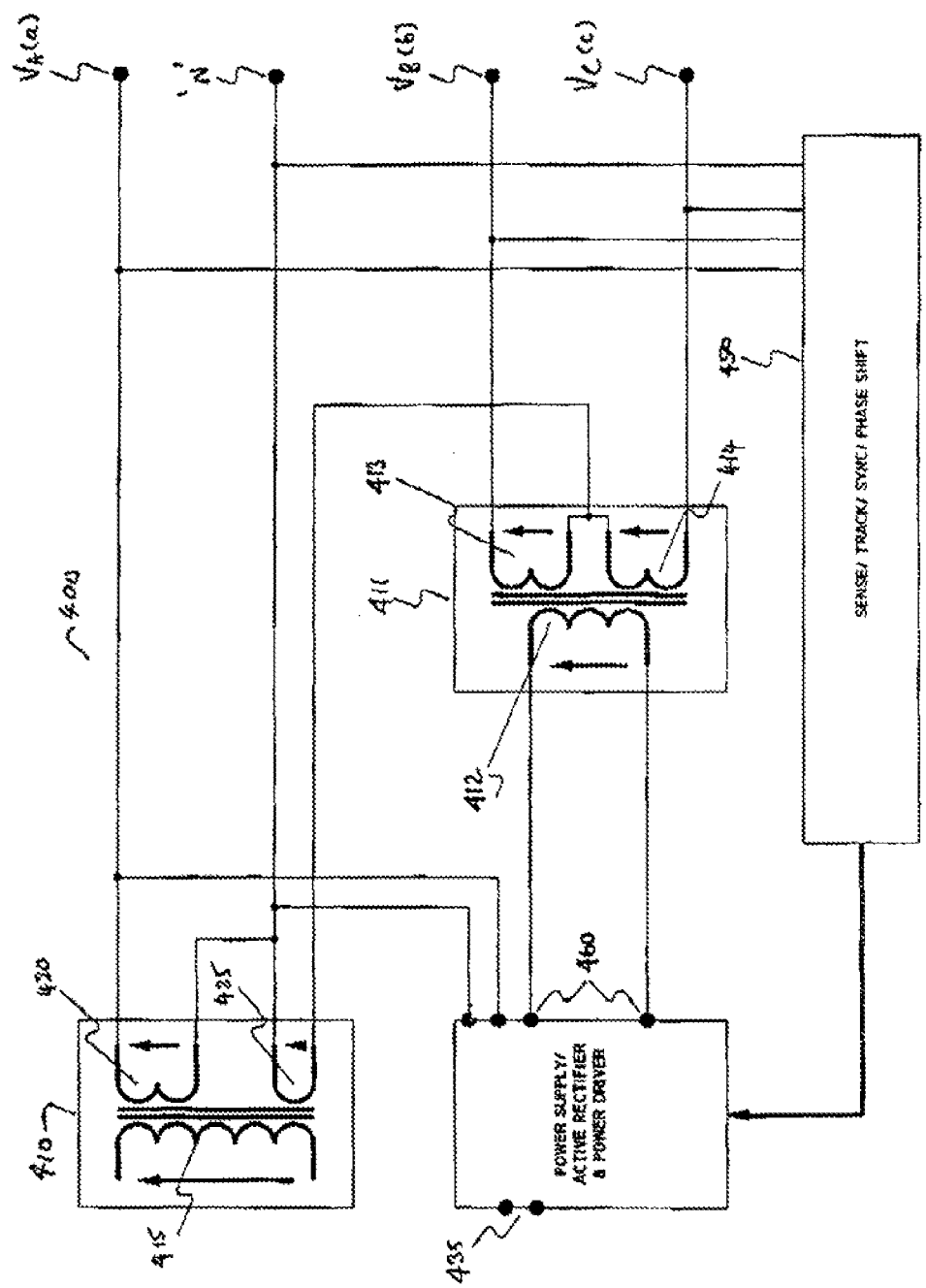

In FIG. 10 there is shown a fourth preferred circuit 400 that may also be used in accordance with the present invention to produce a three phase power supply from one or more single phase source(s). In FIG. 10, like reference numerals to those used in FIGS. 7 to 9 to describe the first to third preferred circuits 100,200,300 are used to denote like parts of the fourth preferred circuit 400. Fourth preferred circuit 400 of FIG. 10 is again similar to that of first preferred circuit 100 shown in FIG. 7, and again only differs with respect to the external power supplies. This particular circuit embodiment 400 is considered the most efficient practical application of the invention, as it requires only one power supply 435 which includes an inverter of 90°, which drives a primary 412 of a second transformer 411, which transformer 411 has split secondaries 413,414 each connected to secondary 425 of first transformer 410. This configuration, again like in previous embodiments, creates Vb (b) and Vc (c) respectively.

Figure 11:
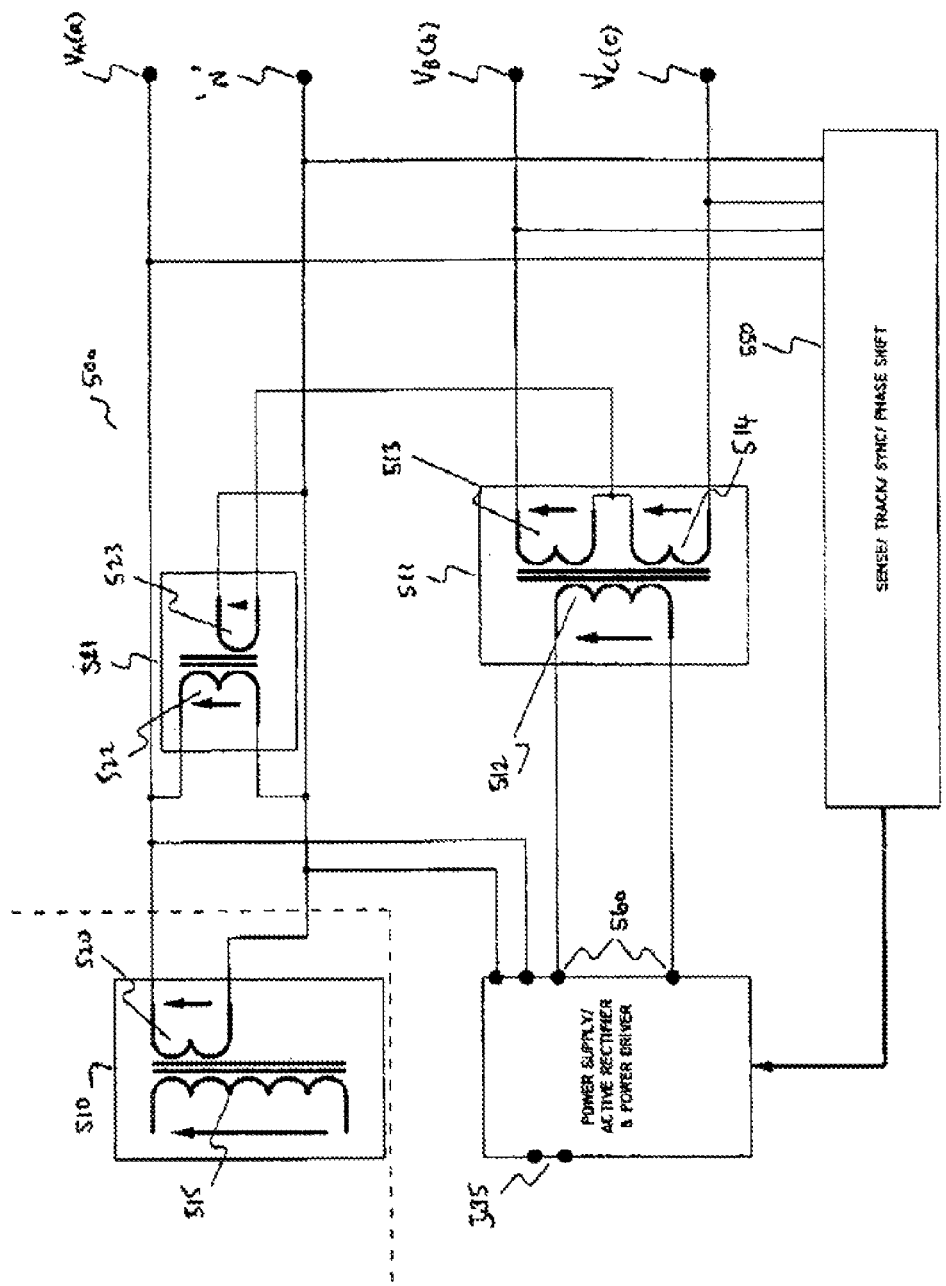

In FIG. 11 there is shown a fifth preferred circuit 500 that may also be used in accordance with the present invention to produce a three phase power supply from one or more single phase source(s). In FIG. 11, like reference numerals to those used in FIGS. 7 to 10 to describe the first to fourth preferred circuits 100,200,300,400 are used to denote like parts of the fifth preferred circuit 500. Fifth preferred circuit 500 of FIG. 11 is similar to that of fourth preferred circuit 400 shown in FIG. 10, and only differs with respect to first transformer 510. This particular circuit embodiment 500 is again considered to be a pragmatic and economical implementation of the invention, as it has a similar construction to that of circuit 400 of FIG. 10. Only this time, as first transformer 510 only has one secondary 520, what would have otherwise been the second secondary (e.g. 425 in FIG. 10) has to be artificially created utilizing a third transformer 521. This third transformer 521 has a single unity primary 522, and a single secondary 523 at half unity. This configuration, again like in previous embodiments, creates Vb (b) and Vc (c) respectively. This configuration is particularly suited as an add-on unit for existing widely installed SWER systems (1) or single phase Two Wire systems (10).

Inventive Approaches for Producing a Three Phase Supply:

The invention provides at least four novel approaches to producing a three phase supply from a single phase source.

As per the various preferred circuit (100,200,300,400,500) embodiments of FIGS. 7 to 11, a first novel approach relates to the power utilised by the circuits. That is, the power put through the preferred circuits (100,200,300,400,500) of the invention, is divided into approximately two halves. One half is used as a part of the output power, and the other half is used to supply an inverter that generates a sine like wave, having a 90° phase shift. Hence, only about 50% of the input supply power is used for conversion purposes, and the other 50% remains as is as it does not go through the process of conversion. By using this method of the invention, the conversion efficiency is much higher than existing inverters that convert the full input power into output power, and, the power quality of the three phase output can be kept very high as the amplitude and the phase shift is synchronised with the non-inverted phase, hence negative sequence and balance are kept very accurately.

A second novel approach is that if any part of the preferred conversion circuits (100,200,300,400,500) fail, the main phase (e.g. Va) that passes through the circuits (100,200,300, 400,500) remains intact for essential services.

A third novel approach relates the Electro Magnetic Compatibility ("EMC") of the preferred circuits 100,200,300,400, 500. That is, the EMC of the inverter input is kept very efficient as the front end of the inverter is made with a filtered active rectifier that generates back into the source of supply very low harmonic distortion.

A fourth novel aspect relates to the fact that the preferred inverter circuits have to generate no more than 86.66% of the existing phase amplitude. In power terms this is 25% less conversion losses compared to converting circuits that have to generate 100% of the output amplitude. Further, the fact that the inverter does not have to generate 100% at 90°, but only 86.66%, allows for the inverter controller box to track the input/output non-inverted phase by amplitude and angle, hence allowing the inverter to adjust its amplitude and angle, allowing amplitude balance and 120° accurate separation between the three phases (i.e. Va,Vb,Vc). By having this ability of tracking, very high power quality parameters can be achieved, leading to a high efficiency operating system (i.e. no or minimum negative sequence currents in the system). The circuits (100,200,300,400,500) adjust themselves, in a manner that the 86.66% amplitude at 90° can vary and become 95% at 85° or 95°, depending on the load type and its impact on the input/output phase amplitude and transformer internal impedance. In terms of usage and cost effectiveness, if the purpose of the usage of the circuits (100,200,300,400, 500) is mainly to drive three phase loads, then a simpler version of conversion can be applied. This is by using only one 90° phase shifting, and using a split transformer to create the complimentary 180° which leads to 270° shift, required for the third phase reconstruction. This is also applicable for a large distribution centre connected to many loads that statistically has a balanced current draw.

Preferred Circuit Constructions:

As will be apparent from the preferred schematic diagrams of FIGS. 7 to 11, converting circuits (100,200,300,400,500) of the present invention can be built in various ways, including: Mechanical—where the elected phase shifted component is achieved by running mechanical means to rotate an AC single phase or two phase synchronized generator to complete the missing electrical phases. The electrical generator can be driven by hydraulics, a fuel operated engine, etc; or, Electrical—where a synchronized generator is driven by an electrical motor operated by the existing source of electrical supply or by an external source of electrical supply; or, by Electronic means that converts the electrical supply from what it is into just the required portion of the shifted component of the reconstructed electrical phases.

Preferred Applications of the Methods/Apparatus of the Invention:

The converting apparatus and methods of the invention can be implemented in many ways, not necessarily just for conversion of a single phase supply into a three phase supply at a customer's point of supply—as in the case of existing solutions described above. Instead, implementation can occur also in large scale applications, for example, within electricity distribution networks at various voltages and power capacities. This can also be used to convert a part of a single phase transmission/distribution line into a three phase transmission/distribution line.

The invention may also be incorporated into a single phase high voltage regulator, which may be used in a certain location of a transmission/distribution single phase line, and continue the line as a regulated three phase line. This is especially beneficial where SWER systems are used and the ground connection impedance is relatively high.

The single phase to three phase conversion can be done either at the local point of supply for a consumer, or much further backwards at a point where it is desired to change the distribution network from single phase into a three phase supply, as the conversion methodology of the present invention can work either from low voltages to high voltages.

The methods and apparatus of the present invention provide many advantages to the power supply industry. Most importantly the present invention provides means in which existing SWER (1) or other single phase systems, e.g. 'Two Phase Two Wire' systems 10, etc, can be adapted to supply three phase power to remote or rural consumers.

In this invention, the proposed converting methods/apparatus can be used either to directly operate three phase induction motors by having a supply source of a single phase only, and/or converting a distribution system into three phase having 3 or 4 wires. The preferred method is, however, to provide a 4 wire three phase system, as this allows the connection of either multiple single phase loads or multiple three phase loads, and also allows operation in unbalanced conditions. Furthermore, it provides a means of allowing the installation of protection devices for prevention of electrocution, such devices being normally used in the electrical supply industry.

The following table provides an overview of the solutions and/or advantages provided by the present invention as compared to the existing solutions discussed at the outset of this description:

| Specification: | Present Solution: | Other Solutions: | Note |
|---|---|---|---|
| Three phase 4 wire system: L1, L2, L3, N | Yes | No | 1 |
| Earth fault protection | Yes | No | — |
| Individual phase operation | Yes | No | — |
| Phase voltage balance at imbalanced load | Yes | Not apparent | 2 |
| Phase angle balance at imbalance load | Yes | Not apparent | 2 |
| Designated application | Multiple applications | Generally for three phase induction motors | — |
| Failsafe-essential supply (continuity of operation) | Yes | No | 3 |
| Preferable recommended point of installation | Electrical utility side of the point of common coupling | At the load | 4 |

-continued

| Specification: | Present Solution: | Other Solutions: | Note |
|---|---|---|---|
| Inverter Harmonic Distortion filtering | Yes | No | 5 |
| Harmonic Distortion generation | No | Yes | 5 |
| Implementation at voltages higher than 1000 V | Yes | No | 6 |
| Energy conversion index 50% vs. 100% | Yes | No | 7 |
| Motor assisted converter | No | In certain applications | 8 |
| Static coils/caps PLC controlled converters | No | In certain applications | 8 |

NOTES:
1. Having a Common Neutral ('N') in other solutions requires additional means as, for example, a neutral transformer.
2. Voltage balance at imbalanced loads is especially essential in induction motors in order to prevent Negative Sequence, a phenomena that causes significant deficiencies and induction motor excessive heat.
3. A difference between the proposed invention and other solutions, is that the main phase (the source single phase) is directly connected as one of the three phase outputs, hence in the case of conversion failure, essential single phase supply still continues.
4. The point of common coupling is the point where the electricity utility connects to the private asset of the customer.
5. The present invention is designed for meeting strict Harmonic limitations.
6. The present invention is preferably for electricity distribution at low to medium voltages.
7. The portion of converted/processed energy of the converter's output is around 50%. The other 50% or so of the output is non-converted.
8. The present invention does not require any electromechanical and/or moving parts/components.

These and other advantages of the present invention will be apparent from the detailed description of the preferred embodiments provided hereinbefore.

While this invention has been described in connection with specific embodiments thereof, it will be understood that it is capable of further modification(s). The present invention is intended to cover any variations, uses or adaptations of the invention following in general, the principles of the invention and including such departures from the present disclosure as come within known or customary practice within the art to which the invention pertains and as may be applied to the essential features hereinbefore set forth.

Finally, as the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and the appended claims. Therefore, the specific embodiments are to be understood to be illustrative of the many ways in which the principles of the present invention may be practiced.

Where the terms "comprise", "comprises", "comprised" or "comprising" are used in this specification, they are to be interpreted as specifying the presence of the stated features, integers, steps or components referred to, but not to preclude the presence or addition of one or more other features, integers, steps, components to be grouped therewith.

The invention claimed is:

1. A method of converting a single phase power supply source into a three phase power supply source, wherein said single phase power supply source includes at least one input active and an input neutral, and wherein said three phase power supply source is a three phase star having three output actives and said input neutral as its common neutral, said method including the steps of: using said input active as a first output active of said three phase power supply source; and, creating a second and third output active of said three phase power supply source using part of said single phase power supply source and/or an external power supply source, at negative polarity and at half magnitude with reference to said first output active, combined with at least one phase shifting inverting circuit which generates its output at 90° at a magnitude of 0.866 with reference to said first output active.

2. The method as claimed in claim 1, wherein at least one supply transformer having a single primary and at least one secondary is used to reverse the polarity and reduce the magnitude of said single phase power supply source and/or said external power supply source.

3. The method as claimed in claim 1, further including the step of: using said output of said at least one phase shift inverting circuit to drive at least one center-tapped transformer to generate outputs of 90° and 270° respectively with reference to said first output active.

4. The method as claimed in claim 1, wherein said single phase power supply source is selected from the group consisting of: a single phase SWER supply source; a single phase, 'Two Phase Two Wire', supply source; a single phase electricity distribution supply source; local or remote generators; wind, solar or wave energy sources; or chemical or mechanical supply sources.

5. The method as claimed in claim 1, wherein said external power supply source is selected from the group consisting of: a single phase SWER supply source; a single phase, 'Two Phase Two Wire', supply source; a single phase electricity distribution supply source; local or remote generators; wind, solar or wave energy sources; or chemical or mechanical supply sources.

6. The method as claimed in claim 1, further including the steps of: monitoring the amplitude and phase angle of said second and third output actives with reference to said first output active, and adjusting the output of said at least one phase shift inverting circuit so that the amplitude and phase angle of said second and third output actives substantially tracks that of said first output active.

7. The method as claimed in claim 1, further including the step of: using two phase shifting inverting circuits to generate outputs of 90° and 270° respectively with reference to said first output active.

8. The method as claimed in claim 7, further including the steps of: monitoring the amplitude and phase angle of said second and third output actives with reference to said first output active, and adjusting the output of said two phase shift inverting circuits so that the amplitude and phase angle of said second and third output actives substantially tracks that of said first output active.

9. An apparatus for converting a single phase power supply source into a three phase power supply source, wherein said single phase power supply source includes at least one input active and an input neutral, and wherein said three phase power supply source is a three phase star having three output actives and said input neutral as its common neutral, said apparatus including: terminal means for connecting said input active to said apparatus to be used as a first output active of said three phase power supply source; and, phase generation means for creating a second and third output active of said three phase power supply source, wherein said phase generation means uses part of said single phase power supply source and/or an external power supply source, at negative polarity and at half magnitude with reference to said first output active, combined with at least one phase shifting inverting circuit which generates its output at 90° at a magnitude of 0.866 with reference to said first output active, to generate said second and third output actives.

10. The apparatus as claimed in claim 9, wherein said phase generation means further includes at least one center-tapped transformer which is driven by said output of said at least one phase shift inverting circuit to generate outputs of 90° and 270° respectively with reference to said first output active.

11. The apparatus as claimed in claim 9, wherein said single phase power supply source is selected from the group consisting of: a single phase SWER supply source; a single phase, 'Two Phase Two Wire', supply source; a single phase electricity distribution supply source; local or remote generators; wind, solar or wave energy sources; or chemical or mechanical supply sources.

12. The apparatus as claimed in claim 9, wherein said external power supply source is selected from the group consisting of: a single phase SWER supply source; a single phase, 'Two Phase Two Wire', supply source; a single phase electricity distribution supply source; local or remote generators; wind, solar or wave energy sources; or chemical or mechanical supply sources.

13. The apparatus as claimed in claim 9, wherein said phase generation means includes at least one supply transformer having a single primary and at least one secondary for reversing the polarity and reducing the magnitude of said single phase power supply source and/or said external power supply source.

14. The apparatus as claimed in claim 9, wherein said phase generation means includes two phase shift inverting circuits to generate outputs of 90° and 270° respectively with reference to said first output active.

15. The apparatus as claimed in claim 9, wherein said phase generation means further includes monitoring means for monitoring the amplitude and phase angle of said second and third output actives with reference to said first output active, and for adjusting the output of said at least one phase shift inverting circuit so that the amplitude and phase angle of said second and third output actives substantially tracks that of said first output active.

16. The apparatus as claimed in claim 14, wherein said phase generation means further includes monitoring means for monitoring the amplitude and phase angle of said second and third output actives with reference to said first output active, and for adjusting the output of said two phase shift inverting circuits so that the amplitude and phase angle of said second and third output actives substantially tracks that of said first output active.

* * * * *